United States Patent [19]
Cassese

[11] Patent Number: 4,811,970
[45] Date of Patent: Mar. 14, 1989

[54] FRONT FRAME FORMING PART OF A SUPPORTING STRUCTURE OF A MOTOR VEHICLE

[75] Inventor: Ferdinando Cassese, Modena, Italy

[73] Assignee: Ferrari Engineering S.p.A., Modena, Italy

[21] Appl. No.: 207,643

[22] Filed: Jun. 16, 1988

[30] Foreign Application Priority Data

Jun. 16, 1987 [IT] Italy .................. 67510 A/87

[51] Int. Cl.⁴ .............................................. B62D 27/04
[52] U.S. Cl. ..................................... 280/788; 180/295; 180/299; 180/312
[58] Field of Search ................ 280/781, 788; 180/295, 180/299, 312

[56] References Cited

U.S. PATENT DOCUMENTS

| | | | |
|---|---|---|---|
| 2,817,557 | 12/1957 | Reynolds | 180/312 |
| 4,093,255 | 6/1978 | Wilfert et al. | 280/788 |
| 4,240,517 | 12/1980 | Harlow, Jr. et al. | 180/295 |
| 4,583,614 | 4/1986 | Knight | 180/295 |
| 4,714,132 | 12/1987 | Hattori et al. | 180/312 |
| 4,723,791 | 2/1988 | Miura et al. | 180/312 |

*Primary Examiner*—Kenneth R. Rice
*Attorney, Agent, or Firm*—Shlesinger, Arkwright & Garvey

[57] ABSTRACT

The front frame is resiliently connected to a central frame of the motor vehicle supporting structure and is resiliently connected to each front wheel by means of a resilient suspension; this frame substantially comprises a plate engageable against the ends of the attachment beams of the central frame and at least two pairs of first arms substantially orthogonal to the plate itself; the said plate includes a substantially flat wall in which are formed perforations and from which project a plurality of ribs to form a flat reticular structural element, and connection of the said plate to the central frame is achieved by means of sleeves made of resilient material and disposed in corresponding nodes of the said reticular structural element.

10 Claims, 7 Drawing Sheets

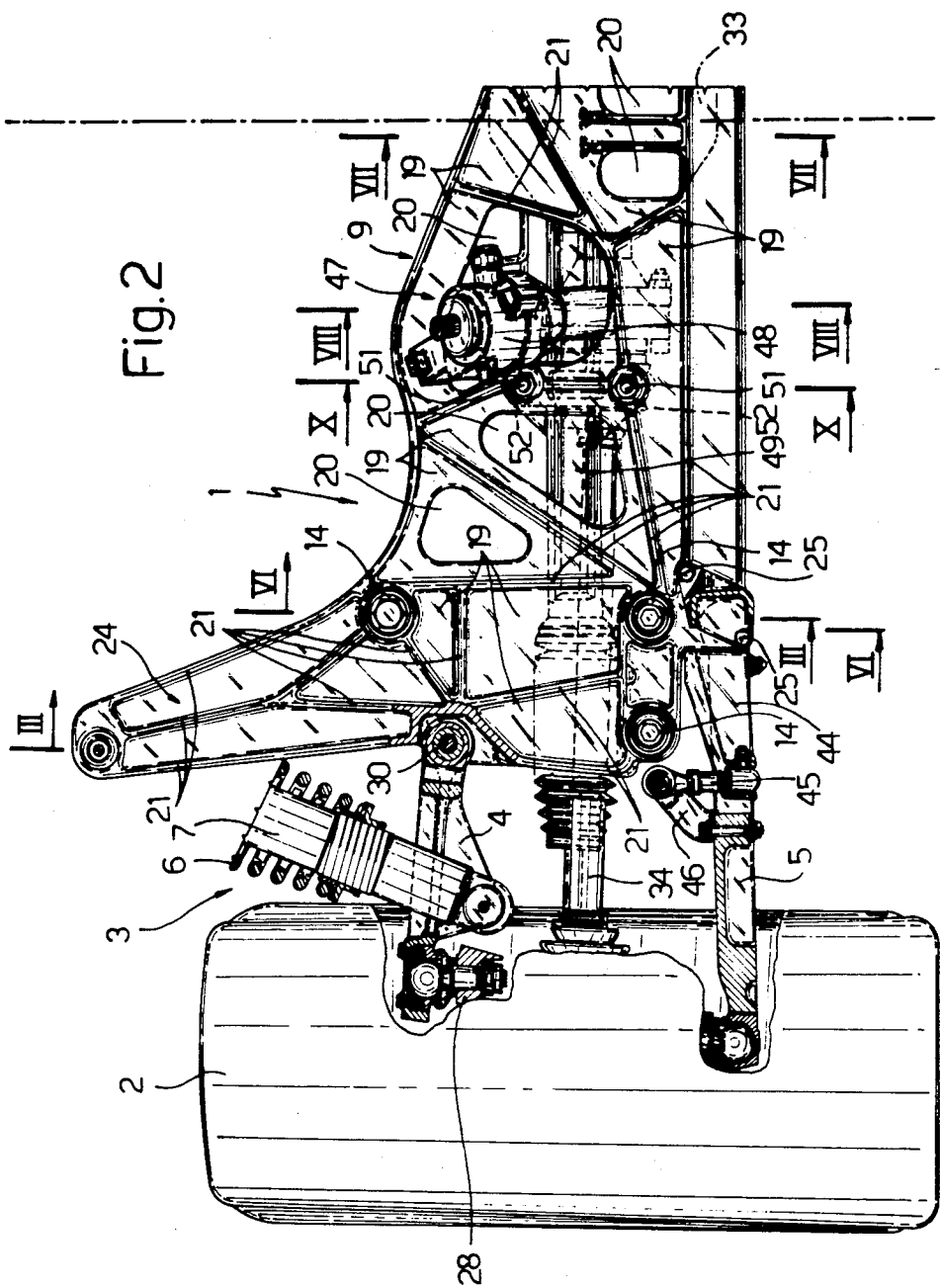

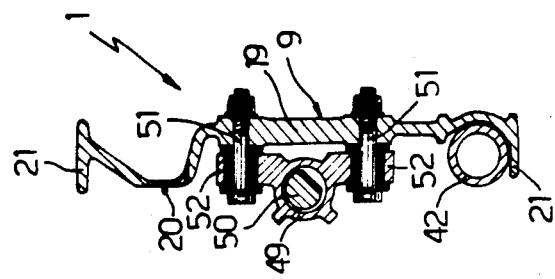
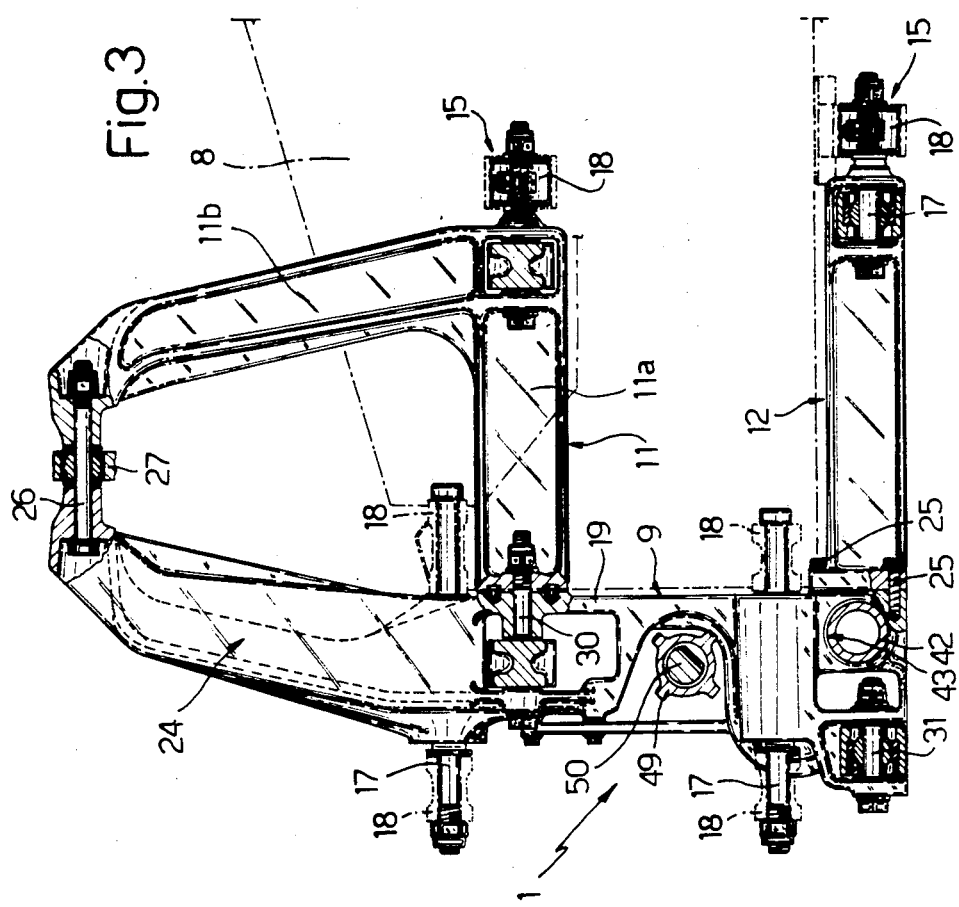

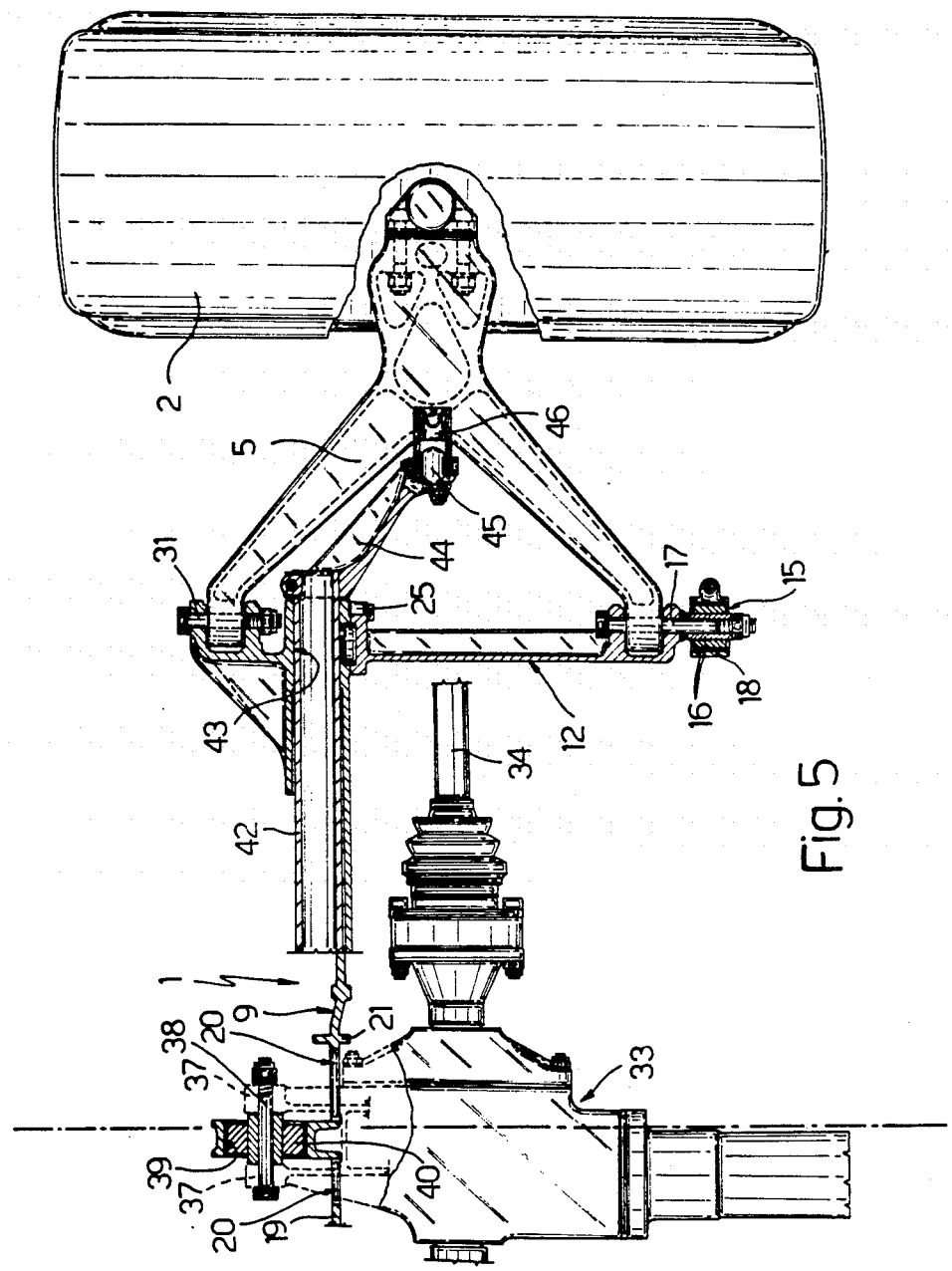

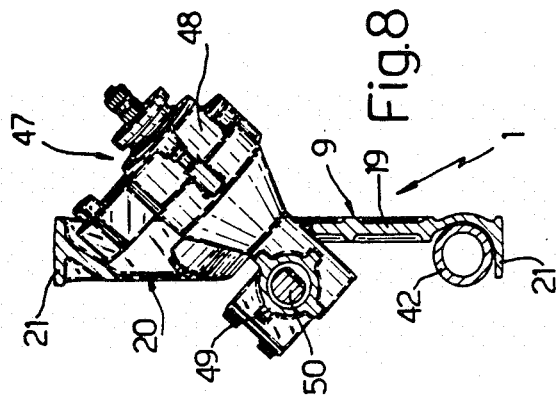
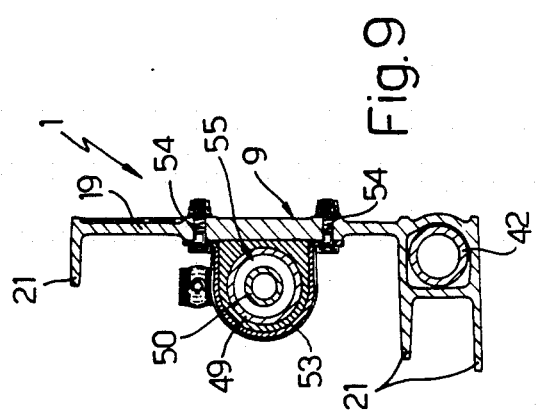

4,811,970

FRONT FRAME FORMING PART OF A SUPPORTING STRUCTURE OF A MOTOR VEHICLE

BACKGROUND OF THE INVENTION

The present invention relates to a front frame forming part of a supporting structure of a motor vehicle connected resiliently to a central frame of this structure which is adapted to support the passenger compartment of the motor vehicle. A supporting structure of this type is described in the patent application filed on the same date by the same applicant and entitled: "A supporting structure for a motor vehicle."

The front frame of the invention can conveniently be utilised in a supporting structure of the type described in that Patent application.

This supporting structure substantially comprises a central frame to define the passenger compartment of the motor vehicle, a front frame connected by first resilient connection means to the front part of the central frame and provided with first attachment means for the front suspension as well as a rear frame connected by second resilient connection means to the rear part of the central frame and provided with second attachment means for the rear suspension. The rear frame supports the motor vehicle engine and some of the transmission members whilst the front frame supports the other transmission members.

SUMMARY OF THE INVENTION

The object of the present invention is that of providing a front frame particularly suitable to be used in a supporting structure of this type and which simultaneously has mechanical strength and rigidity sufficient to be able to resist effectively the high stresses which are transmitted to it by the wheels of the motor vehicle during driving thereof, and is of very reduced dimensions and mass. Another object of the invention is that of providing a front frame for the first indicated use to which several parts of the transmission and various other parts of the motor vehicle can be connected with ease and safety.

This object is achieved by means of a front frame forming part of a supporting structure for a motor vehicle and resiliently connected to a central frame of the said structure which is adapted to support the motor vehicle passenger compartment, the said front frame being resiliently connected to each front wheel of the motor vehicle by a resilient suspension, the said central frame comprising a pair of parallel attachment beams projecting from this frame in the direction of its longitudinal axis and the said front frame including a plate adapted to be carried at the ends of the said beams and at least two pairs of first arms substantially orthogonal to the said plate and adapted to lie along the outer lateral surfaces of the said beams, the said front frame being further fixed to the said beams by means of two first series of three sleeves made of a resilient material and disposed on each side of the plate, and two second series of two sleeves connecting each pair of arms to the corresponding beam, characterised by the fact that the said plate comprises a substantially flat wall in which are formed perforations and from which projects a plurality of ribs which form a flat reticular structural element, and in that the sleeves of the said first series are disposed in correspondence with nodes of the reticular structural elements.

BRIEF DESCRIPTION OF THE DRAWINGS

For a better understanding of the structure of the front frame of the invention a more detailed description of it will now be given by way of example with reference to the attached drawings, in which:

FIGS. 1 and 2 represent left and right front views respectively of the front frame of the invention forming part of the supporting structure of the motor vehicle and to which are connected various members of the motor vehicle itself;

FIG. 3 is a section through the front frame of the invention taken on the line III—III of FIG. 2;

FIG. 5 is another partially sectioned plan view of the right hand side of the frame of the invention from which, for greater clarity, various parts have been omitted;

FIG. 8 is another section through the frame part of FIG. 2 taken on the line VIII—VIII;

FIG. 9 is a further section through the frame part of FIG. 2 taken on the line IX—IX; and FIG. 10 is a section through the frame part of FIG. 1 taken on the line X—X.

DETAILED DESCRIPTION OF THE INVENTION

Figure 1:
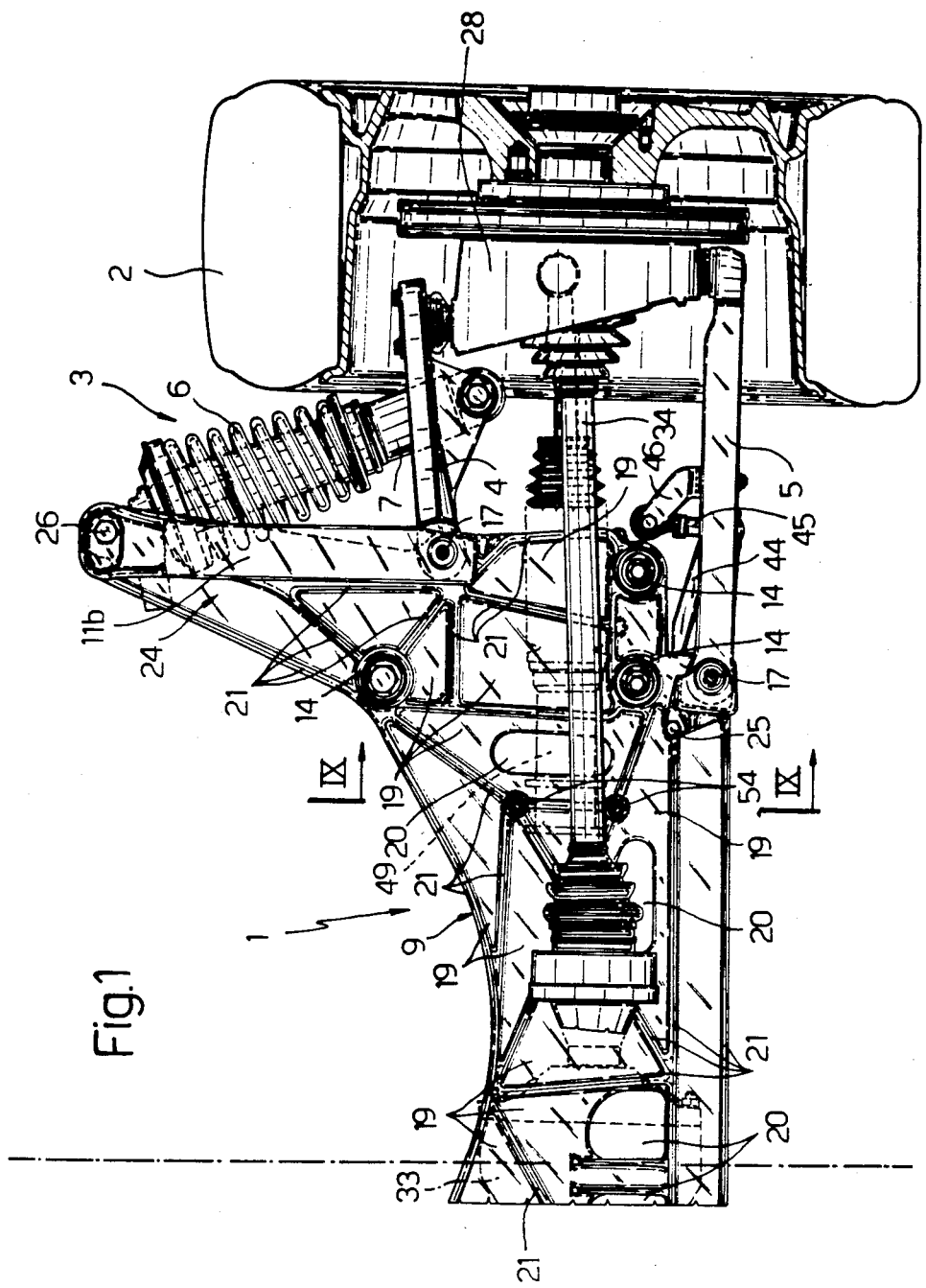

The front frame of the invention, generally indicated 1, is resiliently connected to each front wheel 2 of the motor vehicle by means of a resilient suspension indicated 3, which conveniently comprises a pair of pivoted arms 4 and 5, a coil spring 6, a shock absorber 7 and a torsion bar (not indicated).

This front frame is also connected resiliently to a central frame forming part of the supporting structure of the motor vehicle as is described in the above mentioned Patent application of the same applicant; this central frame, which has not been shown in the drawings, substantially comprises a pair of parallel attachment beams 8 (FIG. 3) projecting from the frame itself in the direction of the longitudinal axis thereof; the front frame 1 comprises a plate 9 adapted to be carried at the ends of the said beams and at least two pairs of arms 11, 12 substantially orthogonal to the plate 9 and which can rest on the outer lateral surfaces of the beams 8.

The front frame 1 is fixed to the beams 8 by means of two first series of three sleeves 14 (FIGS. 1 and 2) made of a resilient material and disposed on each side of the plate 9 as well as two series of two further sleeves 15 (FIG. 3) operable to connect each pair of arms 11 and 12 to the corresponding beam 8.

Figure 6:
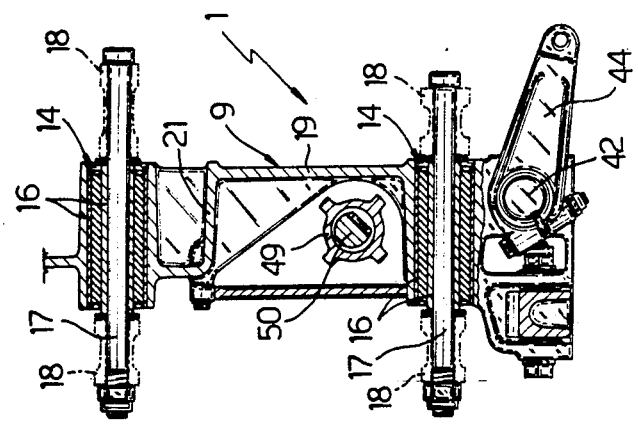
FIG. 6 is a section through the frame part of FIG. 2 taken on the line VI—VI.

Each of the sleeves 14 and 15 is made of a very deformable resilient material, for example rubber or an elastomer, and is housed between a pair of tubular metal elements 16 (FIGS. 6 and 4) one of which is housed in a corresponding seat and the other of which is traversed by a rod 17 of a connection member; this latter is, in turn, supported by corresponding bushes 18 fixed to the beam 8.

According to the invention the plate 9 comprises a substantially flat wall 19 (FIGS. 1 and 2) in which are formed perforations 20 and from which projects a plurality of ribs 21 which are disposed in such a way as to form a flat reticular structural element. The sleeves 14 of the series of sleeves which connect the plate 9 to the beam 8 are disposed substantially in correspondence with nodes of this reticular structural element as is clearly seen from FIGS. 1 and 2.

The plate 9 is provided with a pair of arms 24 each of which is disposed on one side of the plate itself and projects laterally and rearwardly with respect thereto as is seen from FIGS. 1, 2 and 3. Moreover, one end of each of the arms 11 and 12 is connected to the plate 9 by means of threaded connection members 25 and 30 (FIG. 3) and each of the arms 11 is provided with a section 11a which engages on the lateral wall of the corresponding attachment beam 8 and with a further section 11b, substantially orthogonal to the first, and projecting upwardly; the end of the second section 11a (FIG. 3) and the end of a corresponding arm 24 of the beam 9 are shaped and connected together in such a way as to define a portal element able to allow connection of the upper end of a shock absorber 7; the said connection, as is seen in FIG. 3, is achieved by means of a threaded rod 26 which traverses corresponding holes formed in the arm 24 and in the arm section 11b, as well as a shock absorber connection ring 27.

The two arms 4 and 5 of each suspension are able to support a mount 28 (FIGS. 1 and 2) of one of the wheels 2; the upper arm 4 is pivoted by the pin 30 (FIG. 4) to the plate 9 of the front frame and by means of one of the pins 17 to the arm 11; the pivoted arm 5 (FIG. 5) is pivoted by a pin 31 to the plate 9 and by one of the pins 17 to the rear end of one of the arms 12.

Figure 4:
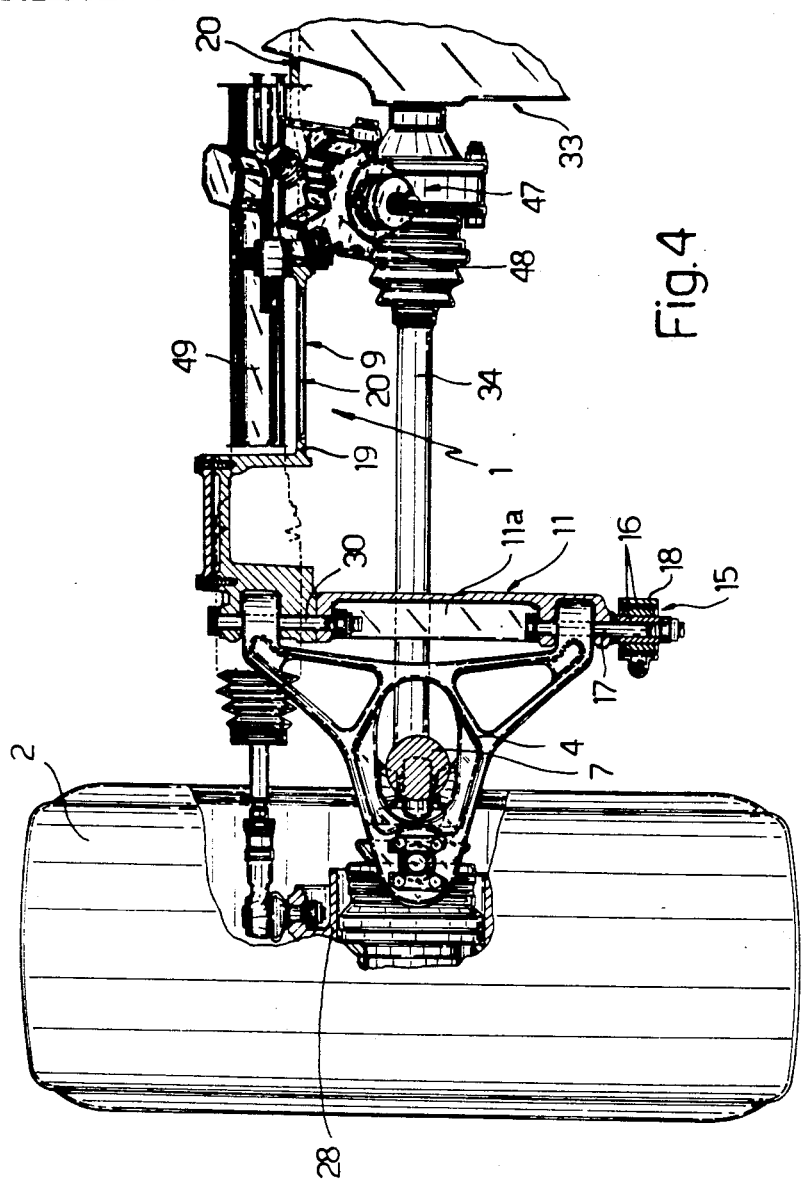
FIG. 4 is a partially sectioned plan view of the left hand part of the frame of the invention.
Figure 7:
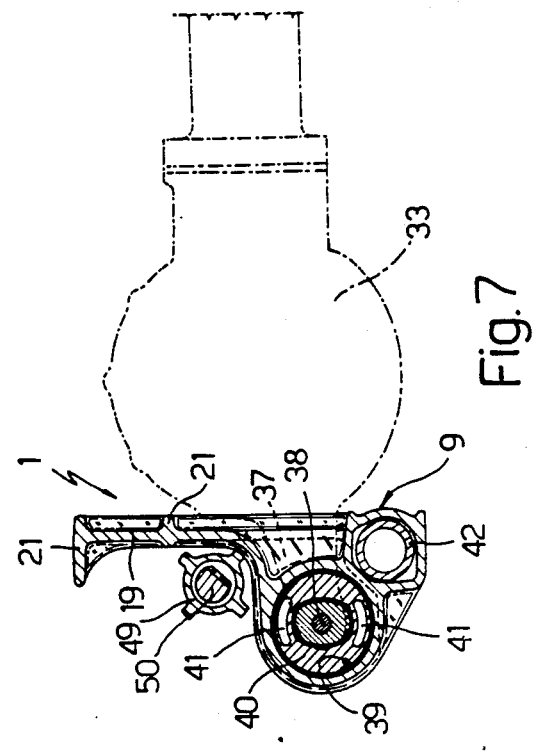
FIG. 7 is a section through the frame part of FIG. 2 taken on the line VII—VII.

As is clearly seen from FIGS. 3 and 4, the pins 30 which serve as pivots for the upper arms 4 also constitute threaded connection members for connecting the arms 11 to the plate 9; moreover the other pins 17 (FIGS. 4 and 5) as well as constituting pivot pins for the arms 4 and 5, also constitute connection elements for the arms 11 and 12 with the sleeves 15 of resilient material. If the motor vehicle is provided with a front differential unit 33 (FIGS. 4 and 7) for driving a pair of half shafts 34 connected to the front wheels 2, the said differential unit and the associated half shafts are positioned between the arms 11 and 12 and rearwardly of the plate 9. The differential unit includes a pair of front projections 37 (FIG. 5) which are resiliently connected to the plate 9; conveniently, for this purpose, the projections 37 are traversed by a connection pin 38 and a cylindrical seat 39 is formed on the plate 9 for housing an annular element of deformable material 40 which is traversed by the pin 38. As is clearly seen in the section of FIG. 7, the annular element 40 has a pair of diametrically opposite arcuate perforations 41 disposed substantially in a vertical plane in such a way as to reduce the rigidity of the annular element in the plane itself.

The two arms 5 of the two suspensions 3 are mechanically connected together by means of a transverse stabilising bar 42 (FIG. 5) which is supported in a pair of seats 43 formed in the lower part of the plate 9. As is clearly seen from FIGS. 1 and 5 the connection between the ends of the bar 42 and each pivoted arm 5 is made by a crank 44 fixed to the bar itself and a link 44 which is connected by means of terminal ball joints at one end to the crank 44 and at the other end to a bracket 46 fixed to the pivoted arm 5.

The steering device, generally indicated 47 (FIGS. 2 and 4) is also fixed to the plate 9, which steering device comprises a steering box 48 and a casing 49 of elongate form in which a rack 40 (FIGS. 8 and 3) is axially movable under the control of the device itself. The fixing of this device to the plate 9 is achieved by a pair of bolts 52 (FIGS. 2 and 10) which traverse holes formed in suitable tongues 52 of the casing 49 and by means of a bracket 53 (FIG. 9) fixed, by means of screws 54, to the wall 19 and which passes around a suitably shaped part 55 of the casing 49.

The front frame which has been described has very high rigidity and mechanical strength which are required to support the stresses transmitted by the motor vehicle wheels during driving of this, and simultaneously have a very reduced weight and dimension; this allows a simple and safe connection both of the suspensions to the frame and of this to the central frame of the support structure. These favourable characteristics derive from the structure of the various parts of the frame which has been described and by the manner of connection of the parts themselves.

It is clear that modifications and variations both to the form and to the disposition of the various parts of the structure which has been described can be introduced thereto without departing from the scope of the invention.

I claim:

1. A front frame forming part of a supporting structure of a motor vehicle and resiliently connected to a central frame of the said structure to support the passenger compartment of the motor vehicle, the said front frame being connected resiliently to each front wheel (2) of the motor vehicle by means of a resilient suspension (3), the said central frame including a pair of parallel attachment beams (8) projecting from the frame itself in the direction of the longitudinal axis thereof and the said front frame including a plate (9) adapted to be carried at the ends of the said beams and at least two pairs of first arms (11, 12) substantially orthogonal to the said plate and engaging on the outer lateral surfaces of the said beams, the said front frame being fixed to the said beams by means of two first series of three sleeves (14) made of resilient material and disposed on each side of the plate and two second series (15) of two sleeves connecting each pair of arms to the corresponding beam, characterised by the fact that the said plate includes a substantially flat wall (19) in which are formed perforations (20) and from which project a plurality of ribs (21) to form a flat reticular structural element, and by the fact that the sleeves (14) of the said first series are disposed in correspondence with nodes of the said reticular structural element.

2. A front frame according to claim 1, characterised by the fact that the said plate (9) is provided with a pair of second arms (24) each of which is disposed on one side of the plate and projects laterally and rearwardly with respect to it, each end of the said first arms (11, 12) being connected to the said plate by threaded connection members (25, 30), the upper arm of each pair of said first arms being provided with a first section (11a) which engages on the lateral wall of a corresponding attachment beam and with a second section (11b) substantially orthogonal to the first and projecting upwardly, the end of the said second arm section (11b) and the end of a corresponding second arm (24) being shaped and connected together in such a way as to define a portal element to allow the connection of the end of a shock absorber (7) which forms part of one of the said resilient suspensions.

3. A front frame according to claim 1, in which each of the said resilient suspensions comprises an articulated quadrilateral having a pair of pivoted arms (4, 5) adapted to support the mounting (28) of one of the front wheels of the motor vehicle, and each of the said pivoted arms having a pair of holes for pivoting to the said front frame, characterised by the fact that one of the said holes is connected to a pin (30, 31) of a pivot formed on the said plate and the other hole is connected to a pin (17) of a pivot formed on the end of one of the said first arms.

4. A front frame according to claim 3, characterised by the fact that some of the said pins (17, 30, 31) of the said pivots also define the said threaded connection members for connecting one of the said first arms to the said plate and others (17) of the said pins of the said pivots are connected to corresponding said sleeves (15) made of resilient material.

5. A front frame according to claim 1, in which the said motor vehicle includes a front differential unit (33) for driving a pair of half shafts (34) connected to the said front wheels, characterised by the fact that the said differential unit and the said half shafts are positioned between the two arms (11, 12) of each pair of said first arms and rearwardly of the said plate (9).

6. A front frame according to claim 5, characterised by the fact that the box of the said differential unit includes at least one front projection (37) which is resiliently connected to the said plate.

7. A front frame according to claim 6, characterised by the fact that the said projection has a connection pin (38) and the said plate has a cylindrical seat (39) able to house an annular element (40) of deformable material which is traversed by the said connection pin.

8. A front frame according to claim 7, characterised by the fact that the said annular element has a pair of diametrically opposite arcuate perforations (41) disposed substantially in a vertical plane and operable to reduce the rigidity of the said annular element in the said plane.

9. A front frame according to claim 1, in which the said resilient suspensions of the said wheels are connected mechanically together by means of a transverse stabilising bar (42) characterised by the fact that in the lower part of the said plate there is formed at least one pair of seats (43) for supporting the said transverse stabilising bar.

10. A front frame according to claim 1, characterised by the fact that the said plate is provided with holes and seats for connecting the motor vehicle steering box (48) to it.

* * * * *